(12) United States Patent
Ichinose et al.

(10) Patent No.: US 6,220,094 B1
(45) Date of Patent: Apr. 24, 2001

(54) ANGULAR VELOCITY SENSOR DRIVING CIRCUIT

(75) Inventors: Toshihiko Ichinose, Nara; Takeshi Uemura; Jiro Terada, both of Osaka; Masami Tamura, Kyoto; Kiyohito Nakazawa, Osaka, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/282,532

(22) Filed: Mar. 31, 1999

(30) Foreign Application Priority Data

Mar. 31, 1998 (JP) .................................................. 10-085729

(51) Int. Cl.[7] ........................................................ G01P 9/04
(52) U.S. Cl. ......................................... 73/504.16; 73/1.77
(58) Field of Search ............................. 73/504.12, 504.13, 73/504.14, 504.15, 504.16, 504.04, 504.02, 1.77; 310/329, 370, 316, 317

(56) References Cited

U.S. PATENT DOCUMENTS

| 5,408,876 | * | 4/1995 | Macy | ................................. | 73/504.16 |
| 5,806,364 | * | 9/1998 | Kato et al. | ........................ | 73/504.12 |
| 5,939,630 | * | 8/1999 | Nozoe et al. | ...................... | 73/504.16 |
| 5,942,686 | * | 8/1999 | Bhardwaj | .......................... | 73/504.16 |

FOREIGN PATENT DOCUMENTS

| 709965 | 5/1996 | (EP) . |
| 09033262 | 2/1997 | (JP) . |

OTHER PUBLICATIONS

"Yaw Rate Sensor" by Yoshimi Yoshino et al. Journal of Nippondenso Engineering Sociery, vol. 38, No. 3, 1994 (with partial English translation).

* cited by examiner

*Primary Examiner*—Helen Kwok
(74) *Attorney, Agent, or Firm*—Ratner & Prestia

(57) ABSTRACT

An angular velocity sensor driving circuit includes a driving part for a vibrator, a vibration level detector, a coriolis force detector, a first amplifier for amplifying an output signal of the vibration level detector, a rectifying circuit, a variable gain amplifier, a voltage amplifier, a level judging circuit and switching means. The gain of the voltage amplifier or the gain of a variable gain amplifier is varied by a switching circuit which is controlled by the output signal of a level judging circuit which compares the output signal of the rectifying circuit and a reference voltage. By using the switching circuit rapid start up of the angular velocity sensor can be achieved.

4 Claims, 5 Drawing Sheets

Output signal of 11

Applied voltage for 10

The first stage | The second stage

Output signal of 11

Applied voltage for 10

ANGULAR VELOCITY SENSOR DRIVING CIRCUIT

FIELD OF THE INVENTION

The present invention relates to a driving circuit of an angular velocity sensor which is used for portable VCRs or for vehicle control systems. Especially, the present invention aims to shorten a starting time of an angular velocity sensor.

BACKGROUND OF THE INVENTION

One example of an angular velocity sensor driving circuit is disclosed in pages 30–31 of the Journal of Nippondenso Engineering Society (Vol.38, No. 3, 1994).

The angular velocity sensor driving circuit of the prior art includes a driving part for giving vibration to a tuning fork vibrator, vibration level detecting means for detecting a vibration level of the vibrator, coriolis force detecting means for detecting a coriolis force generated according to an angular velocity, a first amplifier for amplifying an output signal of the vibration level detecting means, a rectifying circuit for rectifying an output signal of the first amplifier to get a DC voltage, a comparator for comparing the output voltage of the rectifying circuit and a reference voltage and a variable gain amplifier, which amplifies a 90 degrees phase shifted output voltage of the first amplifier, and returns the output signal to the driving part to control the amplitude of the tuning fork vibrator to be constant.

At the prior art mentioned above, just after the power source is turned on, the gain of the variable gain amplifier becomes maximum among some gains satisfying necessary condition. And it works to suddenly increase the amplitude of the tuning-fork type vibrator and it has a little effect to shorten the starting time of the sensor.

However, because the variable range of the gain of the variable gain amplifier is limited and can not make large enough, a certain long time has been necessary until the amplitude level of the tuning-fork type vibrator reaches to a predetermined value.

If the maximum value of the gain of the variable gain amplifier is set larger than the predetermined value, the starting time of the sensor can be shortened. But it is difficult to make the maximum value of the gain of the variable gain amplifier larger than the predetermined value from total view points such as saturation problem of the voltage waveform of the variable gain amplifier, keeping the noise reduced, stability when the amplitude of the tuning-fork type vibrator is controlled to be constant, etc.

Therefore, it is difficult to shorten the time (start-up time) to make the vibration amplitude of the tuning fork type vibrator constant without making the maximum value of the gain of the variable gain amplifier larger than a predetermined value.

In the case such as a quartz tuning fork type vibrator having a large value of sharpness Q (vibration energy per input energy), it is difficult to shorten the time constant $t=Q/2f$ (f: driving frequency) without outstanding increase of frequency f. Accordingly, it becomes big obstacle not to be able to make the maximum value of the gain of the variable gain amplifier larger than a predetermined value to reduce the start-up time.

The present invention solves the above-mentioned problem in the prior art and aims to provide an angular velocity sensor driving circuit which make it possible to shorten the start-up time of the angular velocity sensor.

SUMMERY OF THE INVENTION

An angular velocity sensor driving circuit of the present invention includes a) a drive part for giving vibration to a vibrator:

b) a vibration level detector for detecting a vibration level of the vibrator:

c) a coriolis force detector for detecting a coriolis force generated according to an angular velocity:

d) a first amplifier for amplifying an output signal of the vibration level detector:

e) a rectifying circuit for rectifying an output signal of the first amplifier and for getting a DC voltage:

f) a variable gain amplifier receiving the output signal of the first amplifier and varying the gain according to the output voltage of the rectifying circuit: and g) a voltage amplifier receiving the output signal of the variable gain amplifier, and supplying the output signal to the driving part:

wherein the gain of the voltage amplifier is varied by switching means driven by the output signal of a level judging circuit comparing the output of the rectifying circuit and a reference voltage.

DESCRIPTION OF THE PREFERRED EMBODIMENT

Figure 1:
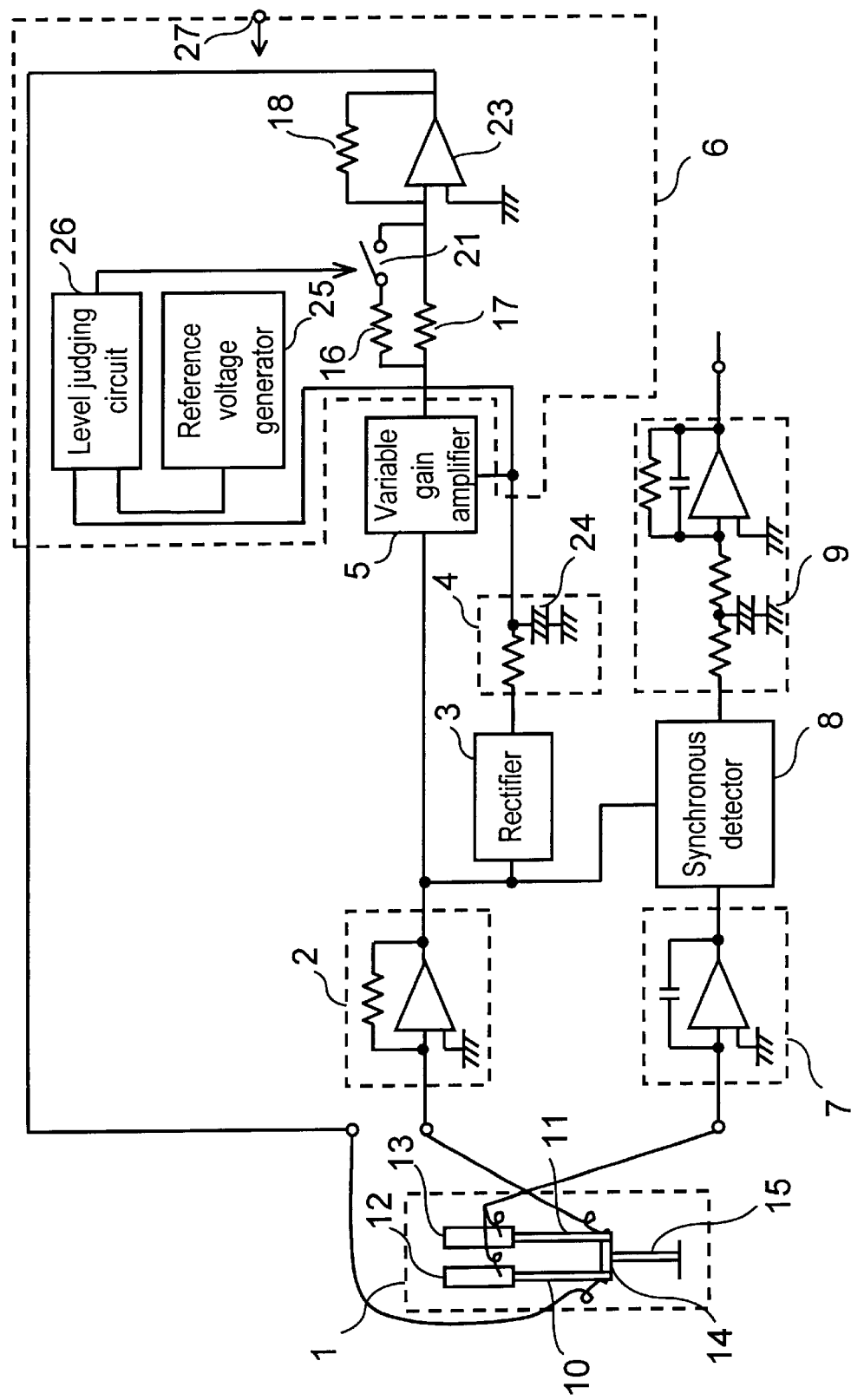
FIG. 1 is a block diagram of an angular velocity sensor driving circuit in accordance with a first exemplary embodiment of the present invention.

The functions of the present invention are explained below, referring to the drawings.

First exemplary embodiment

FIG. 1 is a block diagram of an angular velocity sensor driving circuit in accordance with a first exemplary embodiment of the present invention. In FIG. 1, the block 1 is an angular velocity sensor with a tuning fork type vibrator. The block 2 is a first amplifier. The block 3 is a rectifier. The block 4 is a filter circuit. The block 5 is a variable gain amplifier. The block 6 is a subsequent stage voltage amplifier. The block 7 is a second amplifier. The block 8 is a synchronous detector. The block 9 is a low pass filter. The part 10 is a driving part composed by adhering a piezoelectric element on the vibrating element.

The part 11 is detector composed by adhering a piezoelectric element on the vibrating element and detecting a vibration level. The parts 12 and 13 are first and second detector detecting a coriolis force generated according to an angular velocity, respectively. Drive part 10 and first detector 12 are orthogonally connected. Vibration level detector 11 and second detector 13 are also connected orthogonally. Drive part 10 and vibration level detector 11 are connected with a connecting plate 14, which is supported by a supporting rod 15 at one point.

An angular velocity sensor1 with a tuning fork type vibrator is composed of first and second detector 12 and 13, respectively, drive part 10, vibration level detector 11, connecting plate 14 and supporting rod 15.

An angular velocity sensor driving circuit of this embodiment comprises:

a vibration level detector 11 for detecting a vibration level of a tuning fork type vibrator driven by a drive part 10, a first amplifier 2 for amplifying an output signal of the vibration level detector 11, a rectifier 3 for rectifying an output signal of the first amplifier 2, a filter circuit 4 for filtering an output voltage of the rectifier 3, a variable gain amplifier 5 for controlling the amplitude of the tuning fork type vibrator to be constant by varying the gain according to the output voltage of the filter circuit 4 and a voltage amplifier 6 provided between the variable gain amplifier 5 and the drive part 10. The voltage amplifier 6 has a function to set a time that the amplitude of the tuning fork type vibrator reaches to be constant.

The signals of first and second detector 12 and 13 are amplified at amplifier 7 respectively, detected with a frequency of the tuning fork type vibrator in synchronous detector 8 and become a voltage proportional to the angular velocity. Then the output signal of synchronous detector 8 is amplified at low pass filter circuit 9 and is sent out as an angular velocity voltage signal.

A voltage amplifier 6 provided at the rear stage is composed of resistors 16, 17,18, switching means 21, an operational amplifier 23, a reference voltage generator 25 and a level judging circuit 26.

Figure 2:
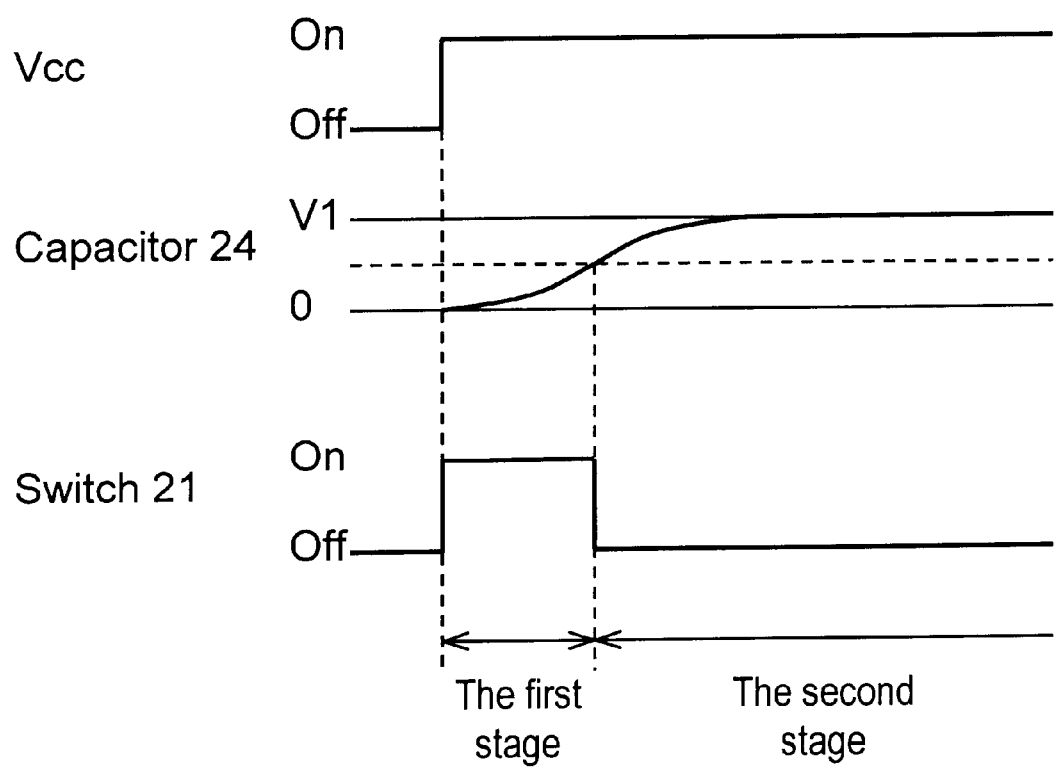
FIG. 2 is a switch control timing chart of a voltage amplifier used in the angular velocity sensor driving circuit of the first exemplary embodiment of the present invention.

Resistors 16, 17 and 18 have resistance values of 100, 10k and 100 k ohms, respectively. When the power source is turned on, switching means 21 is turned on or off according to a charging voltage of capacitor 24, a signal from the level judging circuit 26 (set voltage=V1) and a switch control timing chart as shown in FIG. 2.

Figure 3A:
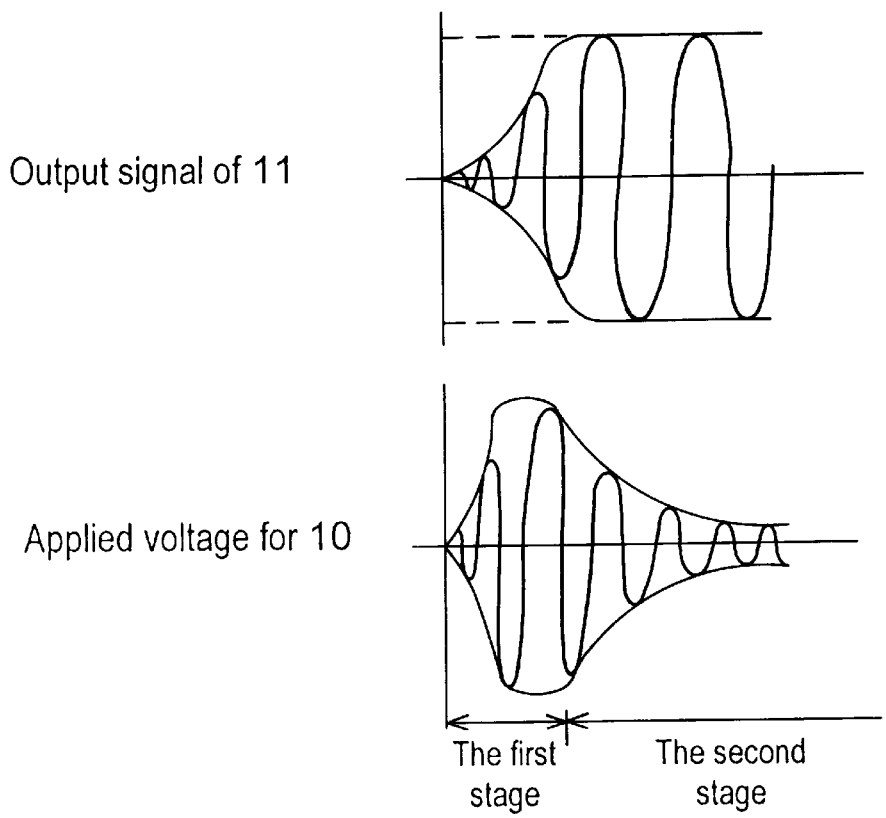
FIG. 3A shows an output signal of a vibration level detector and an applying voltage to a drive part of the angular velocity sensor driving circuit shown in FIG. 1.

In the first and second stages in the timing chart (FIG. 2), the gain of voltage amplifier 6 can be made very large (the voltage applied to drive part 10 can be made high) because the gains of the voltage amplifier 6 are set 1010 times and 10 times, respectively. At the initial stage, amplitude of the tuning fork type vibrator is small (the output signal of vibration level detecting means 11 is small) as shown in FIG. 3A.

The gain of voltage amplifier 6 becomes small (the voltage applied to drive part 10 becomes low) at the later half stage where the amplitude of the tuning fork type vibrator approaches to a predetermined value (the output signal of vibration level detector 11 reaches a predetermined value).

As a result, the starting time of the angular velocity sensor can be outstandingly shortened. And, also, the gain of voltage amplifier 6 provided at the rear stage is made large only at a desired starting period by using the switching means. The maximum value of the gain of variable gain amplifier 5 can be kept in a usual predetermined value at least after entering into the last control period.

Therefore, all the problems of the prior art concerning the saturation of output voltage waveform, the keeping noise reduced, the stability when controlling the amplitude of the tuning fork type vibrator to be constant, etc. can be solved.

As shown in FIG. 2, by setting a charging voltage of capacitor 24 and a setting voltage V1 of level judging circuit 26 to a desired value and by arbitrarily setting the gain of the each stage, the period which the amplitude of the tuning fork type vibrator becomes constant can be arbitrarily decided.

In the first exemplary embodiment of the present invention, an example of controlling switching means 21 for switching the gain of voltage amplifier 6 provided at the rear stage of variable gain amplifier 5 according to the output of level judging circuit 26 was described. But it can also be possible to control the gain of the variable gain amplifier by the switching means.

Figure 3B:
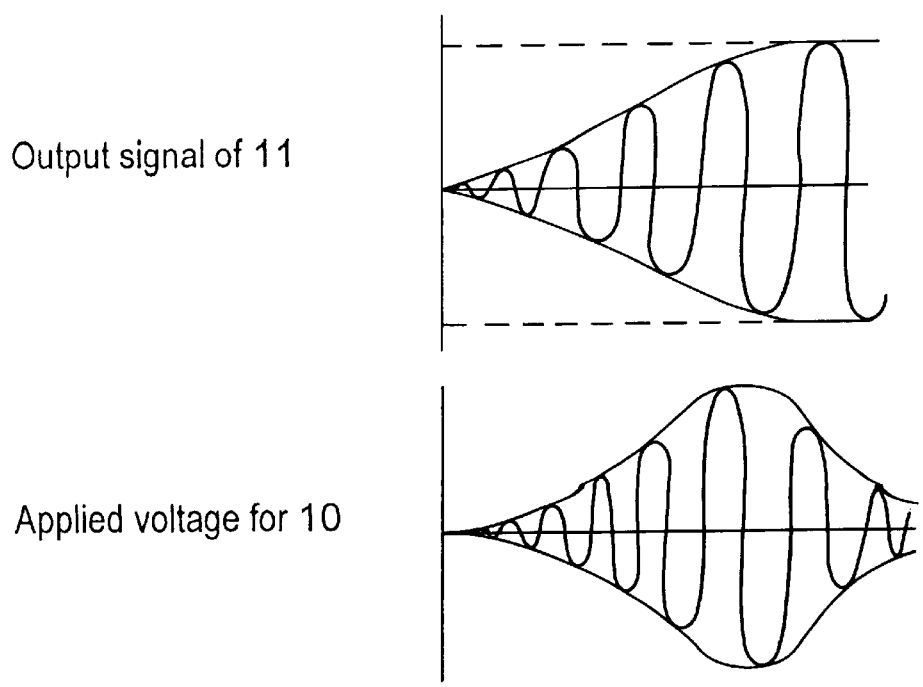
FIG. 3B shows an output signal of a vibration level detecting means and an applying voltage to a drive part at an angular velocity sensor driving circuit of the prior art.

FIG. 3(b) shows a waveform of the output signal of vibration level detecting means 11 and a waveform of an applying voltage to a driving part of the prior art.

In the first exemplary embodiment, although only a example made by adhering a piezoelectric element on a vibrator was explained as a tuning fork vibration type angular velocity sensor, it is not restricted only to the above example. The present invention is most effective especially in the case using quartz tuning fork type vibrator having high sharpness of response Q. Moreover, the vibrator used in the present invention is not always restricted to a conventional quartz tuning fork type vibrator.

Second exemplary embodiment

Figure 4:
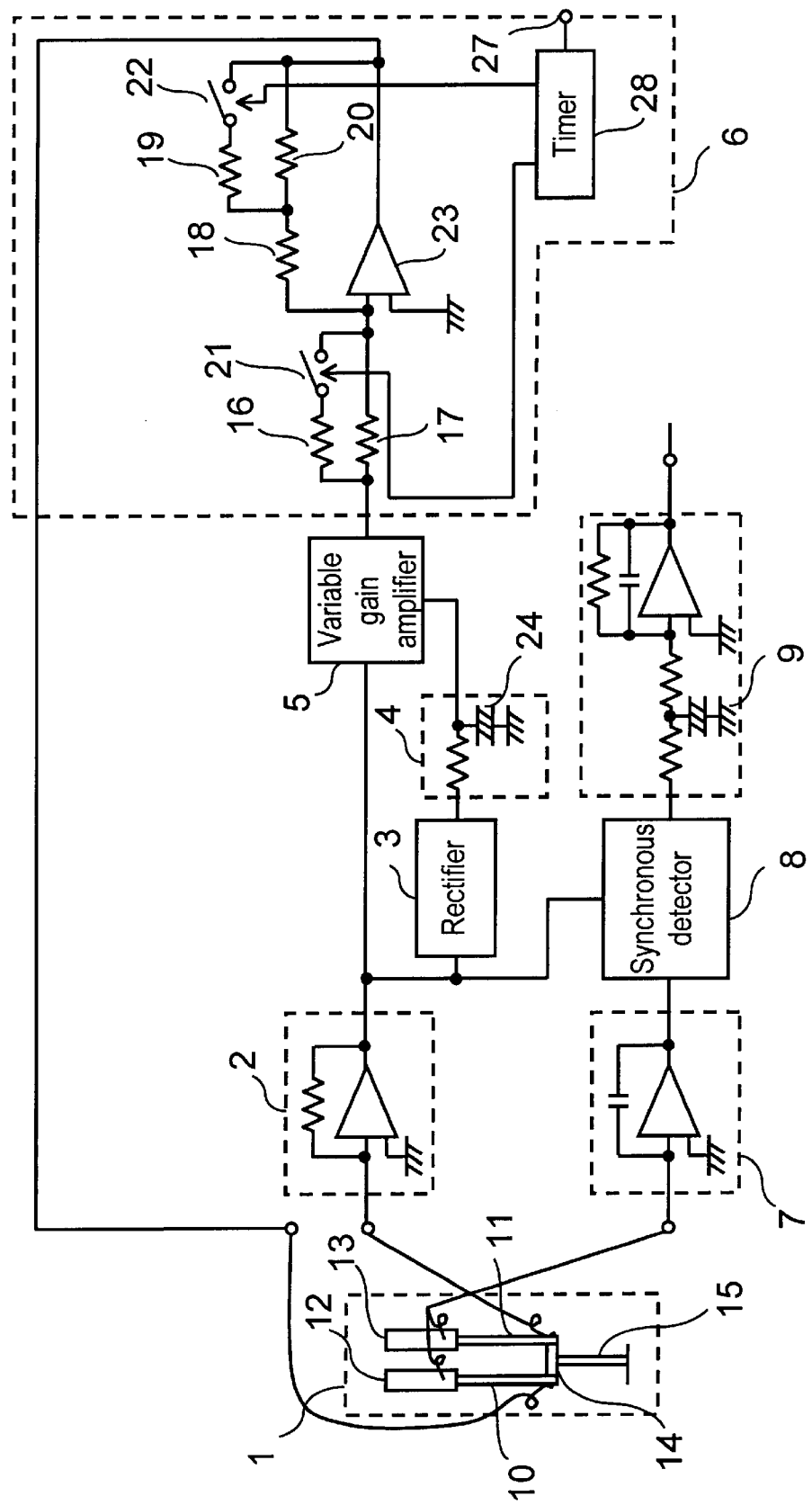
FIG. 4 is a block diagram of an angular velocity sensor driving circuit in accordance with a second exemplary embodiment of the present invention.

FIG. 4 is a block diagram of an angular velocity sensor driving circuit in accordance with a second exemplary embodiment of the present invention. In FIG. 4, the blocks having the same functions as those in FIG. 1 are given the same reference numbers and their detailed explanations are omitted and only the different blocks are explained.

In FIG. 4, voltage amplifier 6 provided at the rear stage is composed of resistors 16, 17, 18, 19,20, switching means 21 and 22, an operational amplifier 23 and a timer circuit 28 for outputting pulses during a predetermined period.

Figure 5:
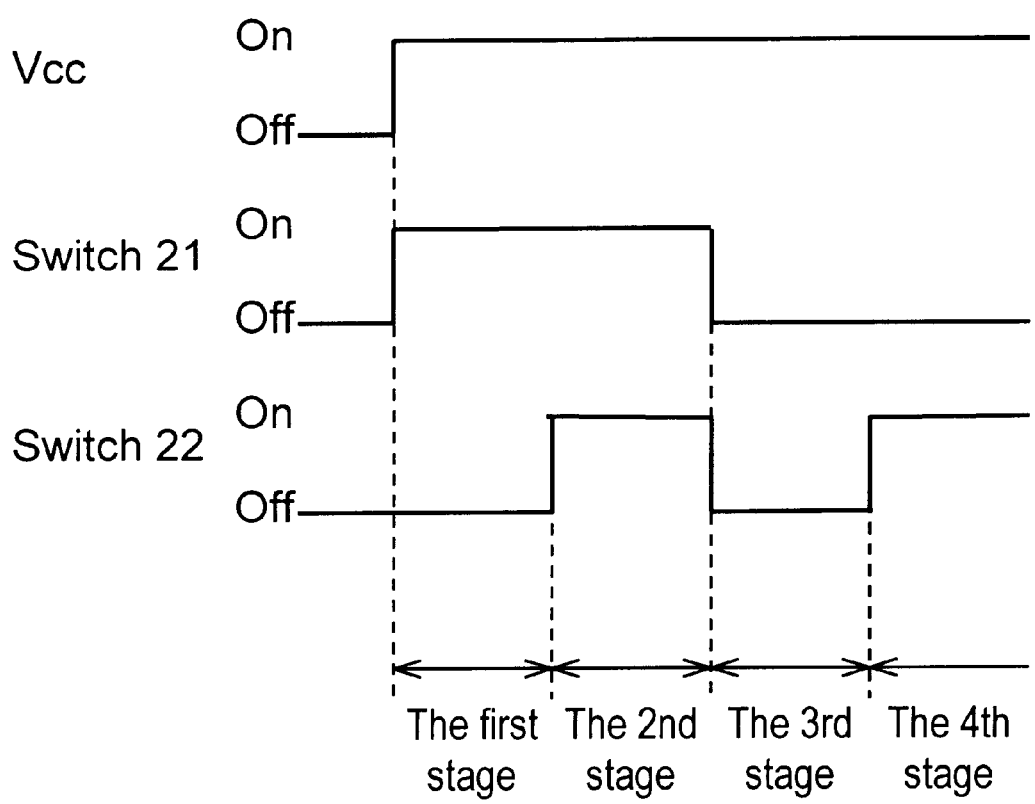
FIG. 5 is a switch control timing chart of a voltage amplifier used in the angular velocity sensor driving circuit of the second exemplary embodiment of the present invention.

Resistors 16, 17, 18, 19 and 20 have resistance values of 100, 10k, 100k, 100 and 10k ohms, respectively. After the power source 27 is turned on and timer circuit 28 is initially triggered, switch means 21 and 22 are controlled to be on or off as shown in a switch control timing chart in FIG. 5.

At the first, the second, the third and the fourth stages, as the gain of the voltage amplifier 6 provided at the rear stage are set to be 1111 times, 1011 times, 11 times and 10 times, respectively, a very high gain can be kept at the initial stage. As a result, the start-up time of the angular velocity sensor can be outstandingly shortened.

On the other hand, the amplitude of the tuning fork vibrator can be kept small because a small gain of the voltage amplifier 6 can be kept at the later half stage in which the amplitude of the tuning fork vibrator approaches to a predetermined value.

According to the second embodiment of the present invention, the gain of voltage amplifier 6 provided at the rear stage can be made large only during a desired starting period by switching means 21 and 22, and the maximum value of the gain of variable gain amplifier 5 can be kept in a usual predetermined value at least after entering into the last controlling period.

Therefore, all the necessary items such as solution to the saturation problem of output voltage waveform, keeping noise reduced, stability when controlling the amplitude of the tuning fork vibrator to be constant, etc. can be established.

By setting the timer circuit 28 and the gain of voltage amplifier 6 at each stage, the period in which the amplitude of the tuning fork vibrator becomes constant can be arbitrarily decided.

Thus, according to the present invention, the gain of the voltage amplifier 6 is made large during a desired starting period by switching means and the maximum value of the gain of the variable gain amplifier can be kept in a usual predetermined value at least in the last controlling stage.

It makes it possible to shorten the start-up time of the angular velocity sensor outstandingly, solving all the previous problems.

| Reference numerals |
|---|
| 1. angular velocity sensor |
| 2. first amplifier |
| 3. rectifier |
| 4. filter circuit |
| 5. variable gain amplifier |
| 6. voltage amplifier |
| 7. second amplifier |
| 8. synchronous detector |
| 9. low pass filter |
| 10. driving part |
| 11. vibration level detector |
| 16, 17, 18, 19, 20 . . . resistor |
| 21, 22. switch means |
| 23. operational amplifier |
| 24. capacitor |
| 25. reference voltage generator |
| 26. level judging circuit |
| 27. timer |

What is claimed is:

1. An angular velocity sensor driving circuit comprising:
   a) a driving part for providing vibration to a vibrator;
   b) a vibration level detector for detecting a vibration level of said vibrator;
   c) a coriolis force detector for detecting a coriolis force generated according to an angular velocity;
   d) a first amplifier for amplifying an output signal of said vibration level detector;
   e) a rectifying circuit for rectifying an output signal of said first amplifier;
   f) a variable gain amplifier receiving an output signal of said first amplifier and varying a gain of said variable gain amplifier according to an output voltage of said rectifying circuit;
   g) a voltage amplifier receiving the output signal of said variable gain amplifier, the voltage amplifier supplying an output signal to said driving part as a driving signal for said driving part;
   h) a level judging circuit which compares the output signal of said rectifying circuit and a reference voltage; and
   switching means for varying at least one of the gain of said variable gain amplifier and a gain of said voltage amplifier responsive to an output signal of said level judging circuit.

2. An angular velocity sensor driving circuit comprising:
   a) a driving part for providing vibration to a vibrator;
   b) a vibration level detector for detecting a vibration level of said vibrator;
   c) a coriolis force detector for detecting a coriolis force generated according to an angular velocity;
   d) a first amplifier for amplifying an output signal of said vibration level detector;
   e) a rectifying circuit for rectifying an output signal of said first amplifier;
   f) a variable gain amplifier receiving an output signal of said first amplifier and varying a gain of said variable gain amplifier according to an output voltage of said rectifying circuit;
   g) a voltage amplifier receiving an output signal of said variable gain amplifier, said voltage amplifier supplying an output signal to said driving part as a driving signal for said driving part;
   h) a timer circuit triggered by activation of a power source, said timer circuit outputting a pulse signal responsive to said activation; and
   switching means for varying a gain of said voltage amplifier responsive to the pulse signal of said timer circuit for a predetermined period.

3. The angular velocity sensor driving circuit of claim 1 wherein the switching means switches between two signal levels in order to vary the gain of at least one of the voltage amplifier and the variable gain amplifier.

4. The angular velocity sensor driving circuit of claim 2 wherein the timer controls the switching means to switch between signal levels in order to vary the gain of the voltage amplifier.

* * * * *